US007446966B2

(12) United States Patent
Kalahasthi et al.

(10) Patent No.: US 7,446,966 B2
(45) Date of Patent: Nov. 4, 2008

(54) METHOD FOR PRECOMPENSATION/WRITE-CURRENT LATCHING TO IMPROVE ERROR RATE

(75) Inventors: Indukumar Chenchu Kalahasthi, San Jose, CA (US); Quan-chiu Harry Lam, San Jose, CA (US); Guo Mian, Fremont, CA (US); Kris Schouterden, San Jose, CA (US); Joseph Emanuel Silva, Hollister, CA (US); Christopher David Wiederholt, Rochester, MN (US); Douglas M. Zuercher, Byron, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 212 days.

(21) Appl. No.: 11/000,105

(22) Filed: Nov. 30, 2004

(65) Prior Publication Data

US 2006/0114587 A1 Jun. 1, 2006

(51) Int. Cl.
*G11B 27/36* (2006.01)
*G11B 5/09* (2006.01)
(52) U.S. Cl. .......................... 360/31; 360/46
(58) Field of Classification Search ....................... None
See application file for complete search history.

(56) References Cited

U.S. PATENT DOCUMENTS

| | | | | |
|---|---|---|---|---|
| 5,600,500 A | 2/1997 | Madsen et al. | ................ | 360/46 |
| 5,808,820 A | 9/1998 | Iwama | ........................ | 360/62 |
| 6,064,534 A | 5/2000 | Simozato | ...................... | 360/46 |
| 6,075,664 A | 6/2000 | Shimizu | ........................ | 360/46 |
| 6,188,531 B1 | 2/2001 | Chang et al. | ................... | 360/46 |
| 6,301,068 B1 | 10/2001 | Ionescu | ........................ | 360/68 |
| 6,310,740 B1 | 10/2001 | Dunbar et al. | ................. | 360/46 |
| 6,826,003 B1 * | 11/2004 | Subrahmanyam | ............ | 360/46 |
| 6,914,738 B2 * | 7/2005 | Fujiwara et al. | ................ | 360/68 |
| 2002/0141094 A1 | 10/2002 | Suzuki et al. | .................. | 360/68 |
| 2003/0223143 A1 | 12/2003 | Fujiwara et al. | ................ | 360/68 |

FOREIGN PATENT DOCUMENTS

| | | |
|---|---|---|
| JP | 63213104 | 9/1988 |
| JP | 1144203 | 6/1989 |
| JP | 4285703 | 10/1992 |
| JP | 7014107 | 1/1995 |
| JP | 2001143209 | 5/2001 |

OTHER PUBLICATIONS

IBM Technical Disclosure Bulletin, Nov. 1994, "Optimal Recording Head Performance Through Programmable Write Current."

* cited by examiner

*Primary Examiner*—Joseph Feild
*Assistant Examiner*—Daniell L Negrón
(74) *Attorney, Agent, or Firm*—Patent Law Office of Larry Guernsey; Larry B. Guernsey

(57) ABSTRACT

A method is presented for writing data to a surface of a magnetic disk in a disk drive. The method includes determining a number of sector groups into which sectors of the data to be written will be grouped, loading registers with current values, kick-latching values, and precompensation values for each of said sector groups, and applying the current values, kick-latching values, and precompensation values for each of the sector groups to the write head while writing data to the sector groups of the recording media.

27 Claims, 11 Drawing Sheets

Precompensation-Latching
Data - Writing Procedure

100

Load to registers:
- Write-current = $I_0$, Kick-setting = $k_0$ and pre-compensation = $p_0$, for first $N_0$ sectors after write-start
- Write-current = $I_1$, Kick-setting = $k_1$, and pre-compensation = $p_1$, for next $N_1$ sectors
- Write-current = $I_2$, Kick-setting = $k_2$, and pre-compensation = $p_2$, for yet later sectors Normally, $(I_0, k_0)$ setting is stronger than $(I_1, k_1)$, and so on.

102

Write data with the appropriate writecurrent and kick -settings in accordance to the sector order as prescribed

104

With properly characterized settings, a stronger $(I_0, k_0)$ setting will compensate for the early-sector writing difficulties, and the writing-strength can be optimized for all sectors. As for the different levels of nonlinear transition shift introduced by the different $(I, k)$ settings, they are pre-compensated by the different pre-compensation settings $(p_0, p_1, p_2)$, which is latched into operation in sync with the $(I, k)$-latches.

FIGURE 10

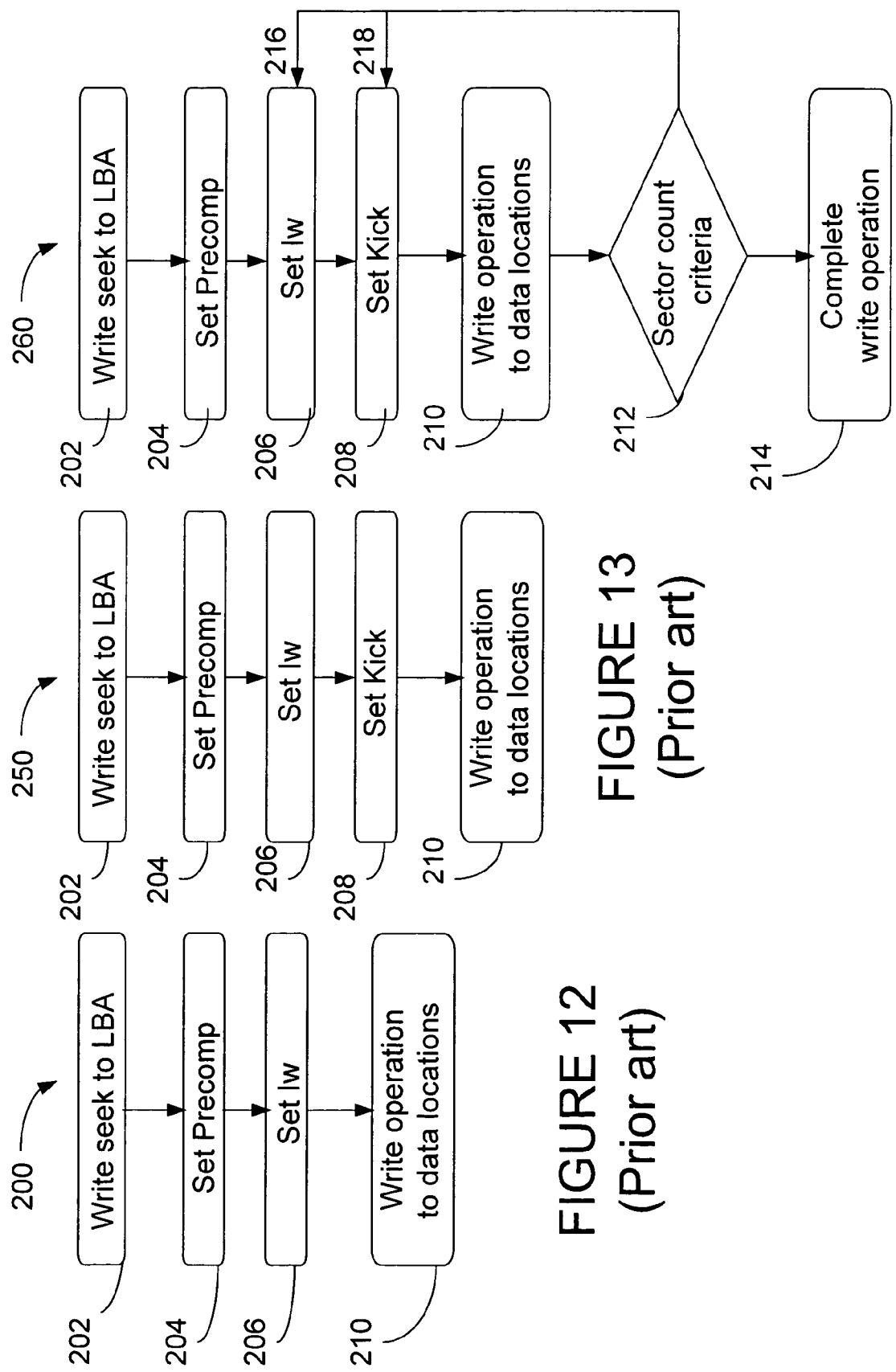

METHOD FOR PRECOMPENSATION/WRITE-CURRENT LATCHING TO IMPROVE ERROR RATE

BACKGROUND OF THE INVENTION

1. Field of the Invention

The present invention relates generally to devices which utilize magnetic write heads and more particularly to computer hard disk drives.

2. Description of the Prior Art

A computer hard disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk and also to decrease the time involved in reading and writing data to the hard disk. It is well known in the Recording-Head industry that when a write-head starts recording data on the media, after a dormant period, it is a relatively weak writer for approximately the first 0.5 msec of writing. After that, it begins to write much better. This so-called "first-sector overwrite" problem is caused by the gradual warming up of the writer by the writing-current that passes through its coil. When the head is "cold", the components of the head are thermally contracted, so that the spacing between the ABS and the disk is slightly increased. Since magnetic field strength decreases with the distance, this results in a decreased field strength in writing the bits being recorded, and thus more potential errors in reading the data later. As the head warms up, the resulting temperature rise gives rise to better magnetic properties in the writing head's magnetic material, as well as a physical protrusion of the writer toward the media through thermal expansion of the materials. This reduces the spacing between the writer and the media, and thus helps the data-writing process. In some severe case, this "first-sector-overwrite" problem can impede the overall magnetic performance of a hard disk drive, giving rise to increased error rates in the first few sectors where the data-writing first occurs.

To correct this problem, it has been recent industry practice to temporarily increase the write-current above the designed nominal value in the first few sectors of writing. The increased write-current will enhance the initial weak writing by giving a larger magnetomotive force to the writer's magnetic circuit. After the writer warms up, the write-current will then be scaled back to its designed nominal value. This practice has been called "write-current latching" or "kick-latching". Here, the word "kick" in the so-called "kick-latching" is referring to the write-current overshoots used in switching from one write-current polarity to the other. The current-overshoot is intended to enhance the transition of the writing magnetic-field.

However there are problems associated with write-current-latching or kick-latching. Although it may improve the writing process during the initial sectors, it introduces another source of signal distortions which degrades the error-rate performance of the system. In today's high-data-rate disk drives, increasing the write-current can artificially change (increase or decrease) the bit spacings between neighboring data bits. With a higher current (or larger current-overshoots) being applied to these initial sectors as it is kick-latched, pattern-dependent distortions to the bits being recorded are created, through transition-shifts. This is because larger overshoots tend to spread di-bit pulses apart inadvertently, and different degrees of overshoot strength (as used in kick-latching) would then distort the bits to different degrees by this bit-spacing spreading. This distortion by large write-current is sometimes referred to as "negative nonlinear transition shift" (or "negative NLTS"), "negative" as opposed to the conventional (or positive) NLTS, in which signal-distortions are caused by neighboring bit-transitions being pulled closer together inadvertently by demagnetization field.

In short, the previous proposal of "kick-latching" by itself may not improve the overall magnetic performance of the system (as measured by error-rate), even though it can improve the overwrite property in the first sectors.

Thus, there is a need for a "precompensation latching" procedure which compensates for the signal-distortions which are introduced by kick-latching.

SUMMARY OF THE INVENTION

A preferred embodiment of the present invention is a method for writing data to a surface of a magnetic disk in a disk drive having a write head. The method includes determining a number of sector groups into which sectors of the data to be written will be grouped, loading preamplifier's write-current and overshoot ("kick") registers with write-current values, kick-latching values, respectively, and loading the channel's precompensation-registers with precompensation values for each of said sector groups, and thus applying the write-current values, kick-latching values, and precompensation values for each of the sector, while writing data to sector groups of the recording media.

It is an advantage of the present invention that it provides improved performance during the initial period of writing, while the write head is still thermally unstable.

It is another advantage of the present invention that it decreases first-sector overwrite errors.

It is yet another advantage of the present invention that it minimizes nonlinear transition shift NLTS errors, both in the early sectors where the write-head is still warming up, and in later sectors where the write-head is already fully warmed up.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIGS. 10-11 show the method of data writing including precompensation-latching values of the present invention;

FIGS. 12-14 show flow-chart summaries of the compensation methods of the prior art.

DETAILED DESCRIPTION OF THE PREFERRED EMBODIMENTS

Figure 1:
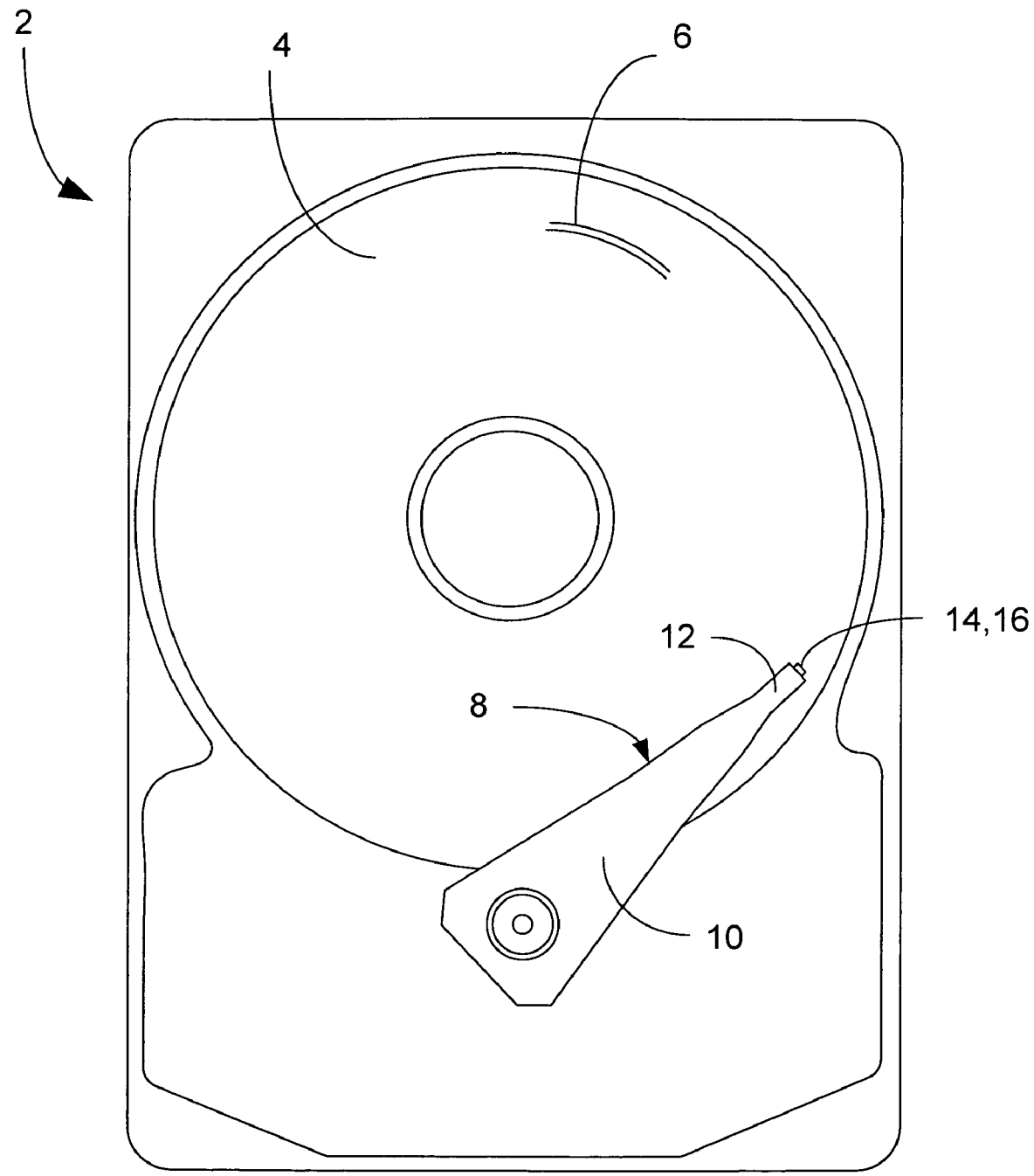
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
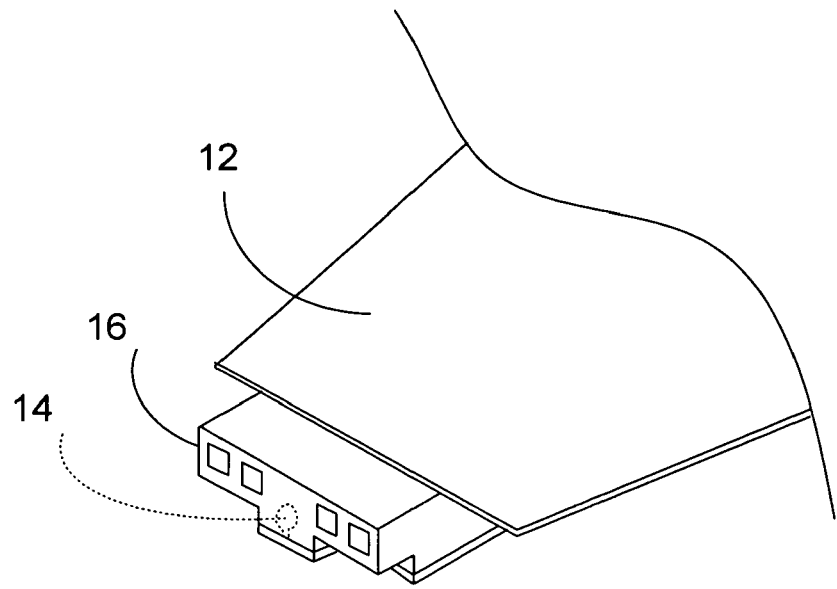
FIG. 2 illustrates a perspective view of an exemplary slider and suspension.
Figure 3:
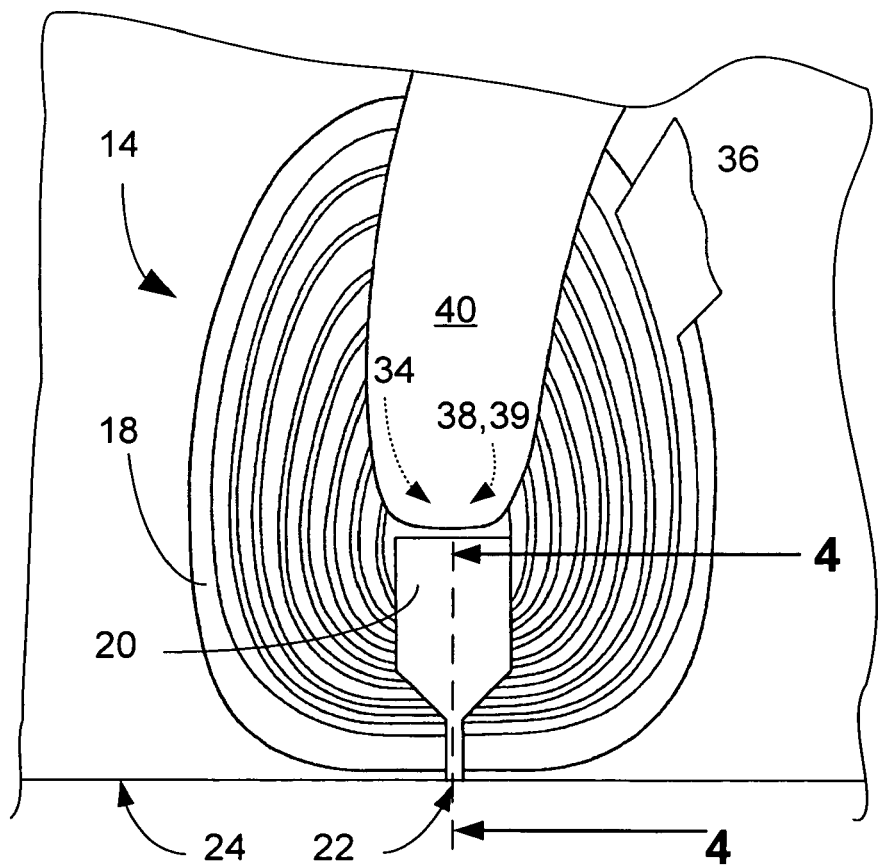
FIG. 3 shows a top plan view of an exemplary read/write head.
Figure 4:
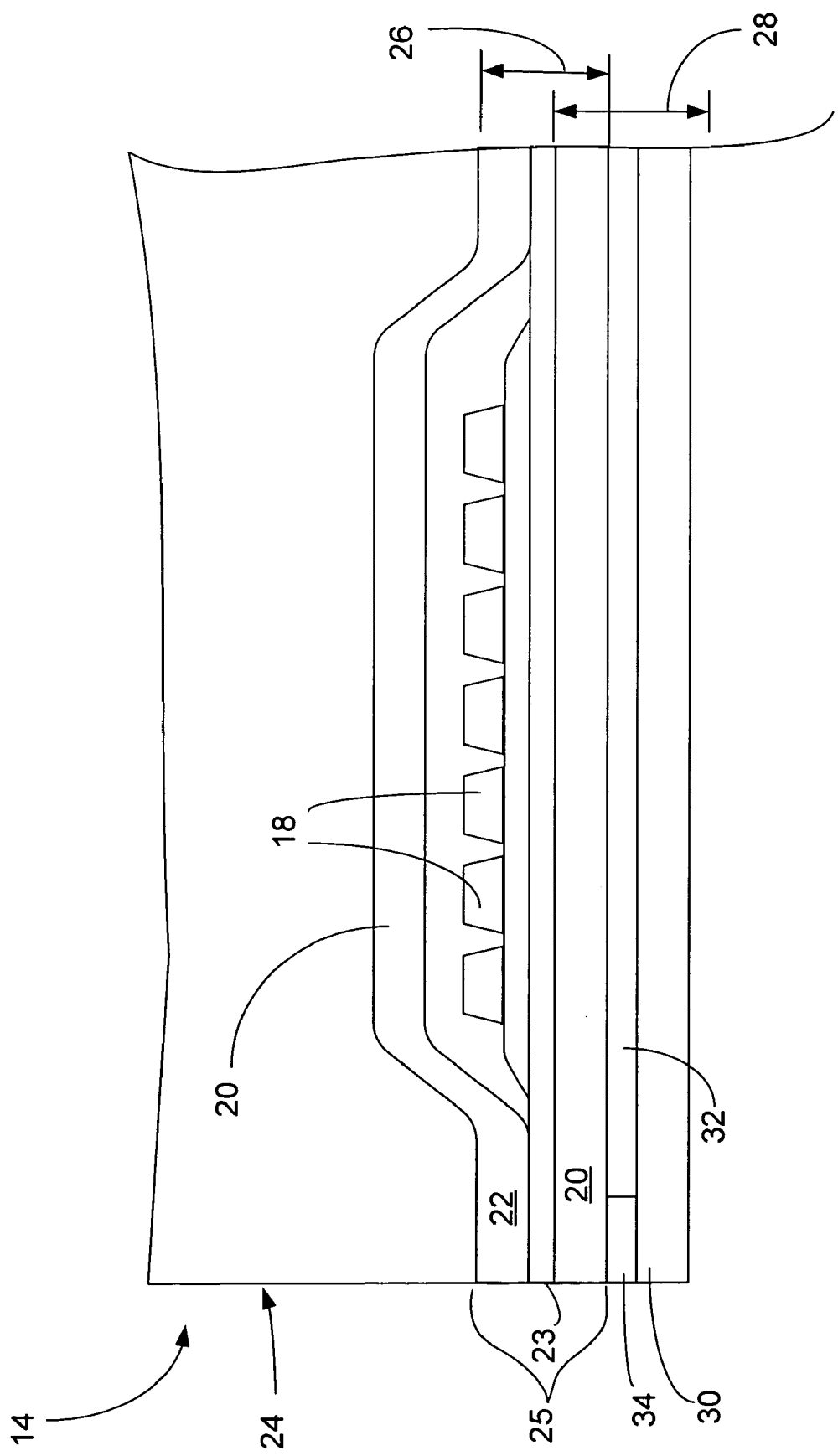
FIG. 4 is a cross-section view of an exemplary read/write head.
Figure 6:
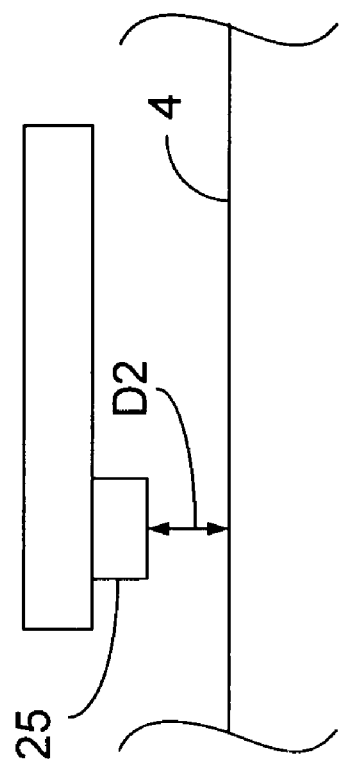
FIG. 6 shows side plan view of a write head and comparative distance from the media surface as the head heats up.
Figure 5:
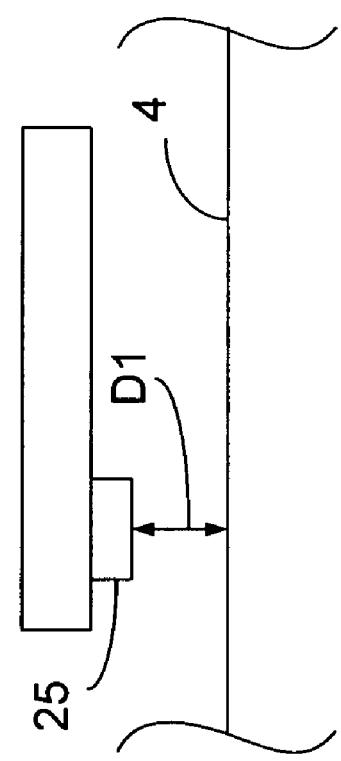
FIG. 5 shows a side plan view of a write head and distance from the media surface as the head starts off cold.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which in some designs also acts as S2 shield, thus making P1/S2 20. The second pole P2 22 is separated from P1/S2 by write gap 23. The P1/S2 20, second pole P2 22 and write gap 23 can be considered together to be included in the write head 25. In a configuration of read head where Current is Perpendicular to the Plane (CPP), Shield S1 30 and P1/S2 20 act as electrodes supplying current to the read sensor 34 which lies between them. An insulation layer 32 also separates the S1 30 and P1/S2 20 electrodes in the area behind the read sensor 34, so that they do not short out along their length. The magnetic head 14 flies on an air cushion between the surface of the disk 4 and the air bearing surface (ABS) 24 of the slider 16 As discussed above, it is well known in the Recording Head industry that when a write head starts recording data on the media, after a dormant period, it is a relatively weak writer for approximately the first 0.5 msec of writing. After that, it begins to write much better. This so-called "first-sector overwrite" problem is caused by the gradual warming up of the writer by the writing-current that passes through its coil. When the head is "cold", the components of the head are thermally contracted, so that the spacing between the ABS and the disk is slightly increased. This is shown generally in FIG. 5, where the distance D1 between the write head 25 and the surface of the disk 4 is shown to be increased when the write head 25 is cold compared to the decreased distance D2, when the write head 25 is warmed up as in FIG. 6. Since magnetic field strength decreases with increasing magnetic spacing, this results in a decreased field strength in the bits written, and thus more potential errors in reading the data later. As the head warms up, the resulting temperature rise gives rise to better magnetic properties in the writing head's magnetic material, as well as a physical protrusion of the writer toward the media through thermal expansion of the materials. This reduces the spacing between the writer 25 and the media 4, and thus helps the data-writing process, as shown in FIG. 6. In some severe case, this "first-sector-overwrite" problem can impede the overall magnetic performance of a hard disk drive, giving rise to increased error rates in the first few sectors where the data-writing first occurs.

To correct this problem, it has been recent industry practice to temporarily increase the write-current above the designed nominal value in the first few sectors of writing. The increased write-current will enhance the initial weak writing by giving a larger magnetomotive force to the writer's magnetic circuit. After the writer warms up, the write-current will then be scaled back to its designed nominal value. This practice has been called "write-current latching" or "kick-latching".

Figure 7:
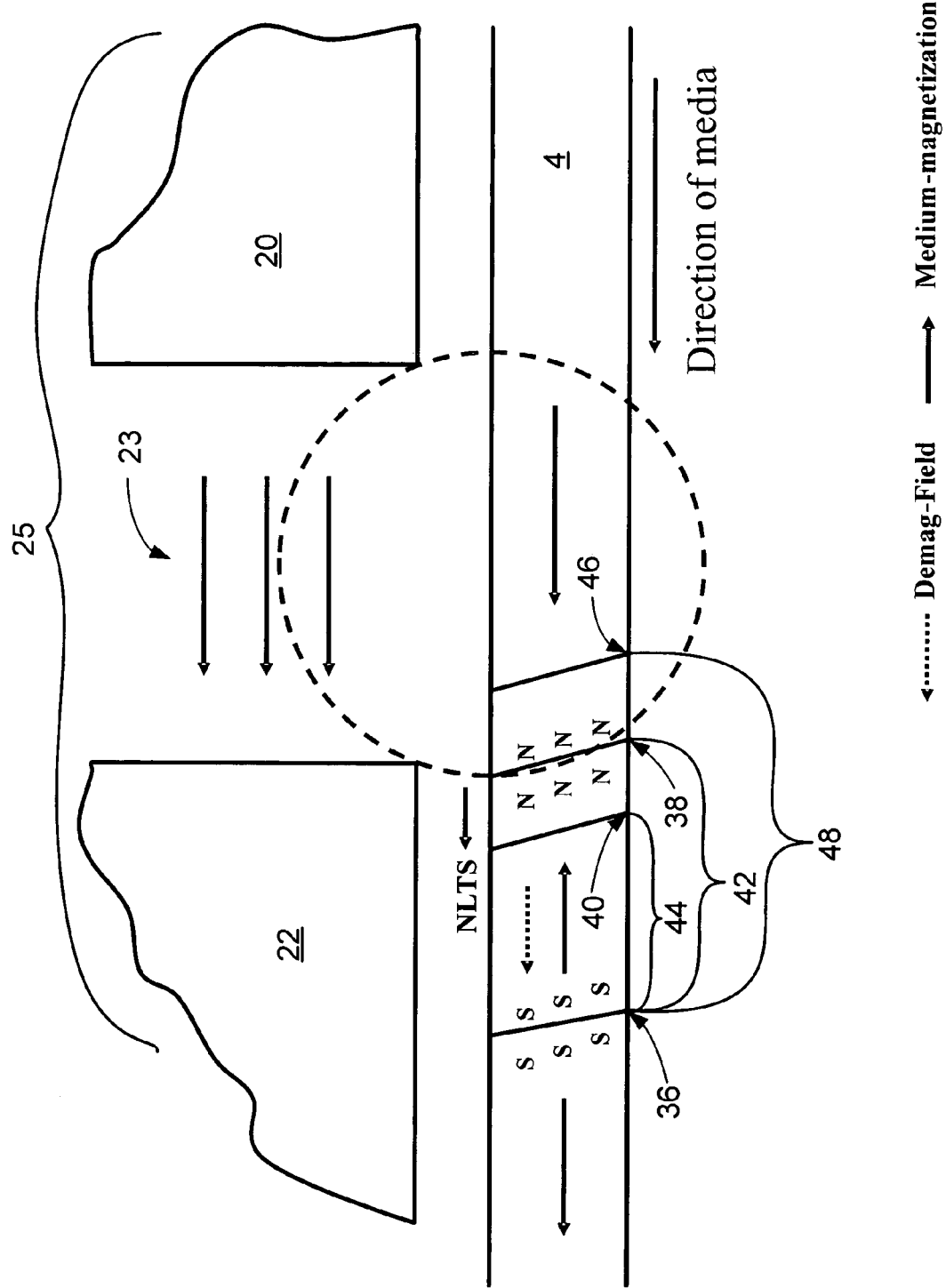
FIG. 7 shows a detail side view of a magnetic write head writing to a storage disk medium, showing the effects of positive and negative nonlinear transition shift (NLTS) on bit cells.

However, as discussed above, there are problems associated with kick-latching. There are effects in which the spacing of the bits are affected resulting in a physical displacement of the bits farther apart or closer together. This phenomenon is referred to as "nonlinear transition shift" or "NLTS", which can occur in two varieties. In conventional NLTS, which is not particularly associated with kick-latching, as shown in FIG. 7, the di-bit (two successively written transitions) tend to shift closer than intended, thus inadvertently decreasing the bit cell length (time between transitions). In this FIG. 7, recording media 4 is shown under parts of the P1 20 and P2 22 poles of a write head 25. A previously written transition 36 is shown, with the intended new transition location 38, thus producing a normal bit cell 42. However, due to the demagnetization-field from the previous transition 36, the actual new transition location 40 is closer to the previously written transition 36 than intended, producing a shortened bit cell 44.

In more recent high data rate disk drives, the bit cell length (time between transitions) is comparable to the time constant of the rise and fall times of the write-current. As a result, larger overshoot tends to spread di bit pulses (two successively written transitions) apart. The more the overshoot, the more the di bit is inadvertently shifted further apart from their intended separation. These produce a delayed transition location 46 and thus a lengthened bit cell 48, as shown also in FIG. 7.

Thus we may speak of two types of NLTS, 1) Conventional or positive NLTS, which is caused by the demagnetization-field of neighboring bits and which needs "positive" precompensation to correct the pulse positions; i.e. the precompensation intentionally delays the second pulse to make up for the NLTS effects, and 2) "Negative" NLTS, which is caused by large write-current overshoot, and which needs "negative" precompensation to correct the pulse positions; i.e. the precompensation tries to move the second pulse forward in timing.

In short, the previous practice of "kick-latching" by itself may not improve the overall magnetic performance of the system as measured by error-rate, due to the varying degree of negative-NLTS introduced by the overshoots changing with sector-counts, even though it can improve the overwrite property in the first sectors.

To address the deficiency of the kick-latching procedure, the present invention augments it with a precompensation-latching ("precomp-latching" for short) procedure. In such a scheme, we allow the precompensation, which addresses the problem of nonlinear transition shift, to have special values in the first sectors of writing, which are different from the designed nominal values. The special precomp-latching values are tailored to the special (most likely higher than normal) write-current values used by the write-current-latching or kick-latching schemes in the first sectors of recording.

In the first sectors of recording, when the writer is still being warmed up and has challenges in writing data, kick-latching will increase the write-current to enhance its writing ability. Simultaneously, the special precompensation-setting of the precomp-latching scheme pre-compensates for the nonlinear bit shift caused by the special (extra) write-current of the kick-latch. In later stages, after approximately 0.5 to 1 msec, when the writer is fully warmed up and has no difficulty in recording data, the write-current, in accordance with the kick-latch scheme, will drop back to the nominal value; simultaneously, the precomp-latch scheme will change the pre-compensation values to the nominal state.

In this manner, not only the writing process is enhanced by the kick-latching, but the actual magnetic performance, as measured by error rate, will be improved because the problems of additional and varying negative-NLTS is being taken care of by precomp-latching.

Figure 8:
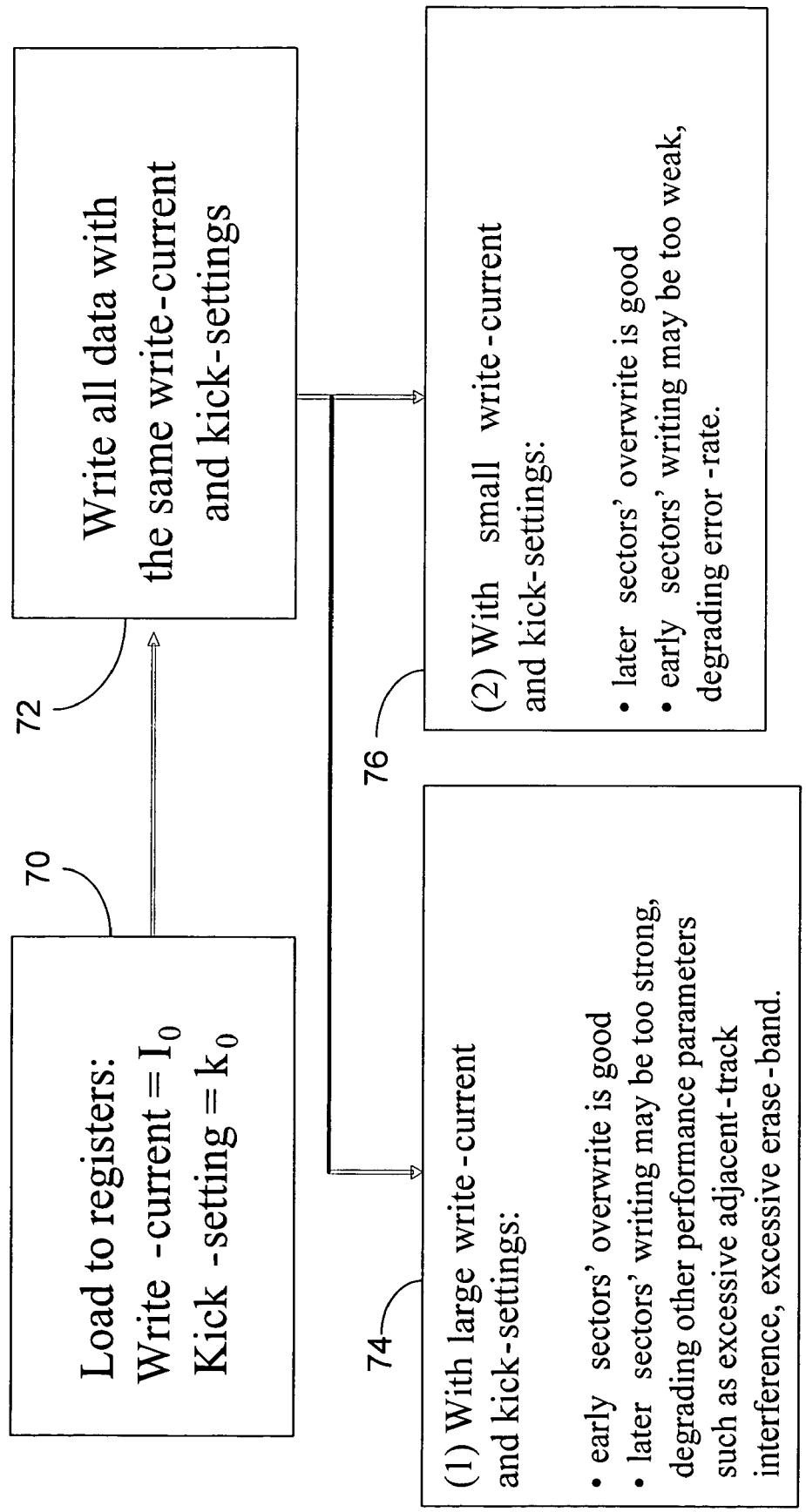
FIG. 8 shows the process of conventional data writing with a single kick-latching value of the prior art.
Figure 9:
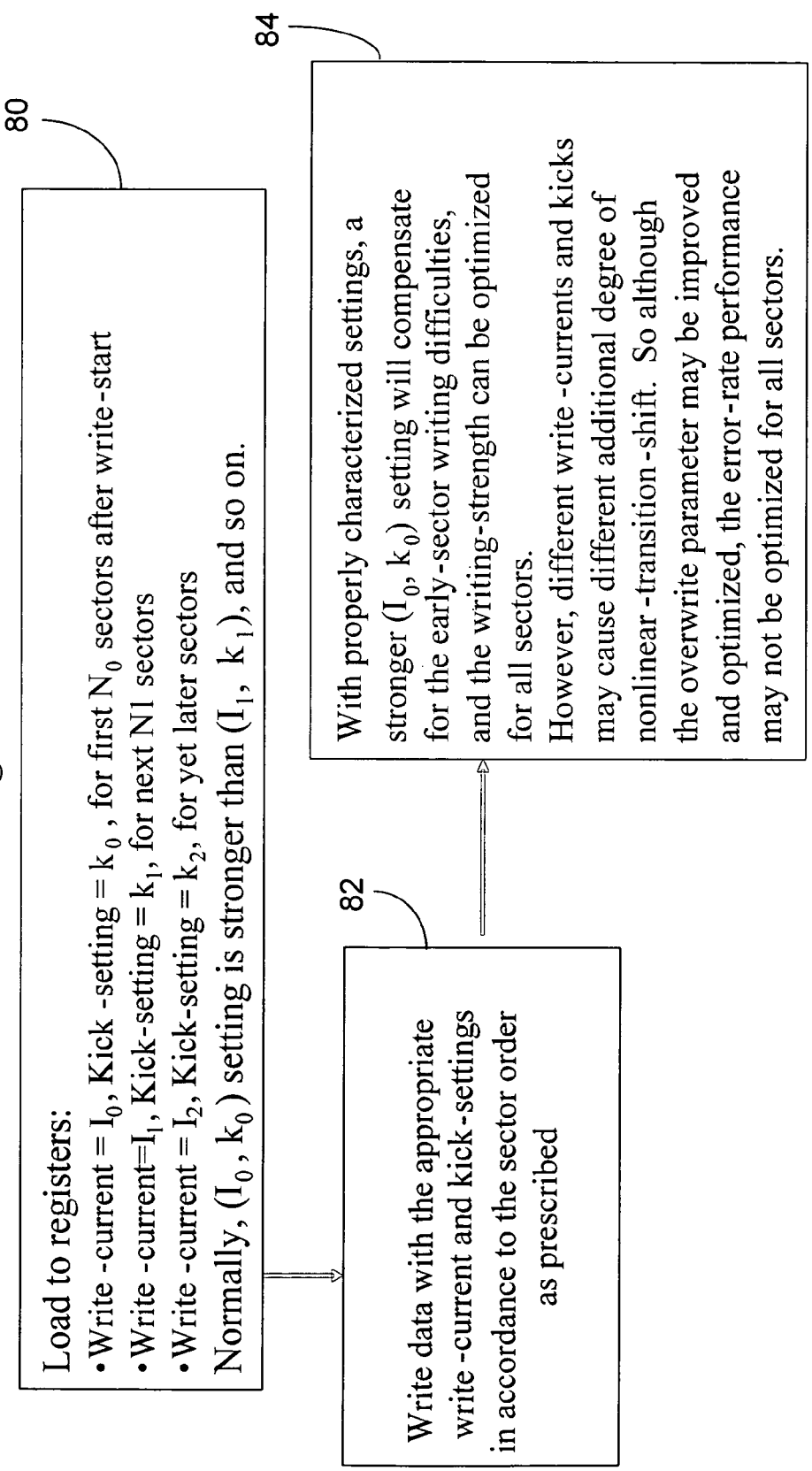
FIG. 9 shows the process of data writing including multiple kick-latching values of the prior art.
Figure 11:
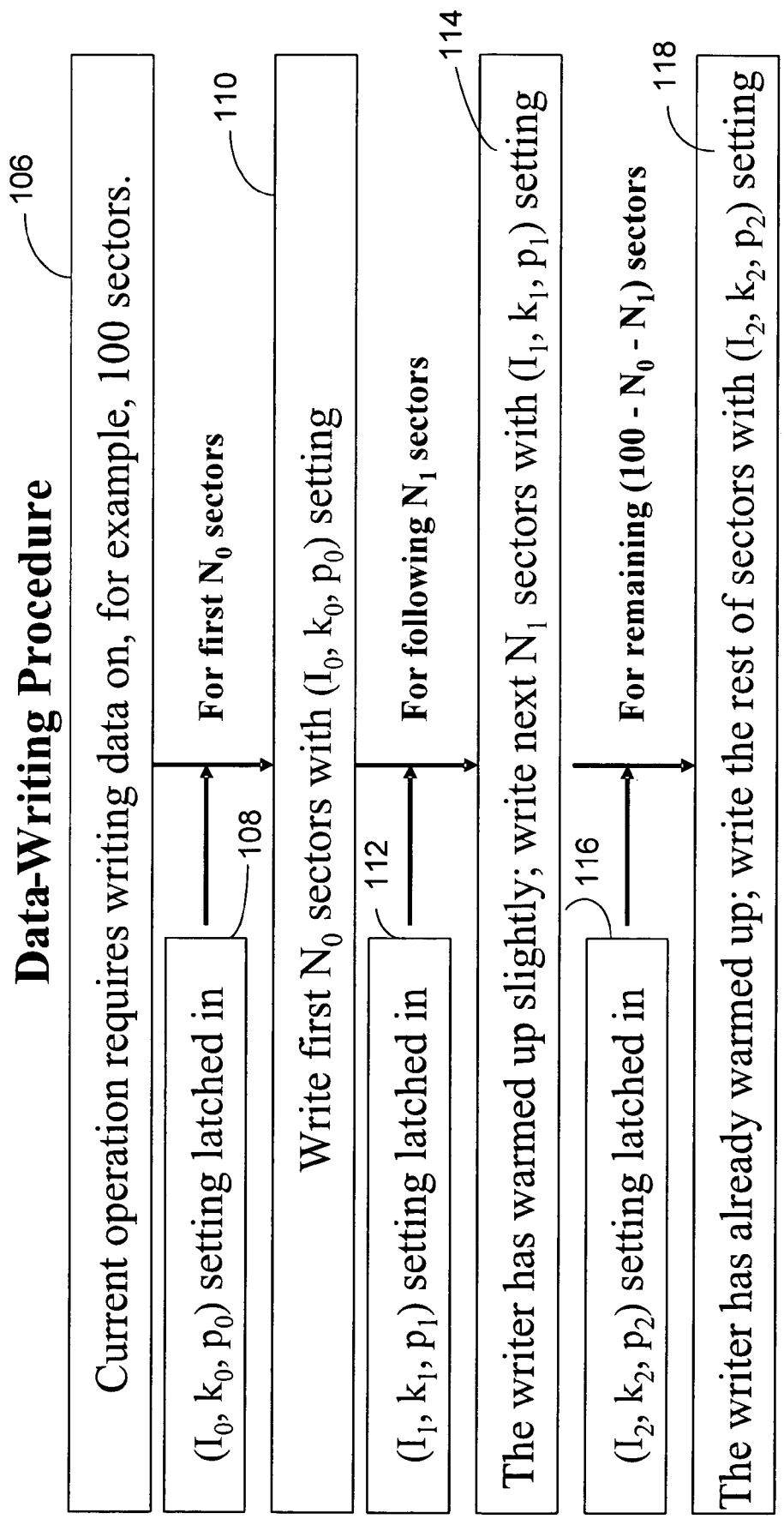

To make clear the comparison between the conventional kick-latching and the precomp-latching of the present invention, FIGS. 8-9 illustrate the conventional procedure, and FIGS. 10-11 discuss the novel precomp-latching procedure.

In the Conventional Data Writing Procedure of FIG. 8 (prior art), the Write-current=$I_0$, and Kick-setting current=$k_0$ are loaded to the preamplifier registers 70, and all data in all sectors is written with the same write-current and kick-settings 72. This typically leads to two results, having different types of errors. 1) With large write-current and kick-settings, early sectors' overwrite is good, but later sectors' writing may be too strong, degrading other performance parameters such as excessive adjacent track interference, and excessive erase band 74. (2) With small write-current and kick-settings, later sectors' overwrite is good, but early sectors' writing may be too weak, degrading the error rate 76.

An improvement to this conventional procedure is shown in FIG. 9 (prior art). In this Previously Proposed Write-Current/Kick-Latching Data Writing Procedure, preamplifier registers are loaded with the following values:

Write-current=$I_0$, Kick-setting=$k_0$, for first $N_0$ sectors after write-start, Write-current=$I_1$, Kick-setting=$k_1$, for next $N_1$ sectors, Write-current=$I_2$, Kick-setting=$k_2$, for yet later sectors.

Normally, because of the aforementioned "first-sector overwrite" problem, $(I_0, k_0)$ setting is stronger than $(I_1, k_1)$, and so on 80.

Using this modified procedure, data is written with the appropriate write-current and kick-settings in accordance to the sector order as prescribed 82. With properly characterized settings, a stronger $(I_0, k_0)$ setting will compensate for the early sector writing difficulties, and the writing strength can be optimized for all sectors. However, different write currents and kicks may cause different additional degree of nonlinear-transition-shift (NLTS). So although the overwrite parameter may be improved and optimized, the error rate performance may not be optimized for all sectors 84.

The present Precompensation-Latching Data-Writing Procedure is discussed in FIGS. 10-11. In this method of the present invention, the preamplifier-registers and channel-registers are loaded with following values:

Preamplifier: write-current=$I_0$, Kick-setting=$k_0$, and channel: precompensation=$p_0$, for first $N_0$ sectors after write start, Preamplifier: write-current=$I_1$, Kick-setting=$k_1$, and channel: precompensation=$p_1$, for next $N_1$ sectors, Preamplifier: write-current=$I_2$, Kick-setting=$k_2$, and channel: precompensation=$p_2$, for yet later sectors 100.

Normally, $(I_0, k_0)$ setting is stronger than $(I_1, k_1)$, and so on.

Using this modified procedure, data is written with the appropriate write-current and kick-settings in accordance to the sector order as prescribed 102. With properly characterized settings, a stronger $(I_0, k_0)$ setting will compensate for the early-sector writing difficulties, and thus the writing strength can be optimized for all sectors. As for the different additional levels of nonlinear transition shift introduced by the different (I, k) settings, they are pre compensated by the different precompensation settings $(p_0, p_1, p_2)$, which is latched into operation in sync with the (I, k)-latches 104, thereby correcting for the NLTS problems encountered by the previous methods.

Discussing this in a slightly different manner in FIG. 11, the Precompensation-Latching Data-Writing Procedure, current operation requires writing data on, for example, 100 sectors 106. $(I_0, k_0, p_0)$ settings are latched in for the first No sectors 108. The first No sectors are written with $(I_0, k_0, p_0)$ settings 110.

Next for the following $N_1$ sectors, $(I_1, k_1, p_1)$ settings are latched in 112. Now that the writer has warmed up slightly, the next $N_1$ sectors are written with $(I_1, k_1, p_1)$ settings 114.

Then for the remaining of the 100 example sectors the $(I_2, k_2, p_2)$ settings are latched in 116. The writer has already warmed up, the rest of sectors are written with $(I_2, k_2, p_2)$ settings 118.

In most cases, it is likely that the initial $(I_0, k_0)$ setting will provide stronger magnetomotive force to the writer, which has not been warmed up. $(I_1, k_1)$ and $(I_2, k_2)$ are likely to be successively more moderate in strength, for the writer is gradually getting warmer. The precompensation setting $(p_0, p_1, p_2)$ will respectively provide the suitable timing precompensations to adjust for the artifacts in transition-location-shift, caused by the different (I, k) settings.

Figure 15:
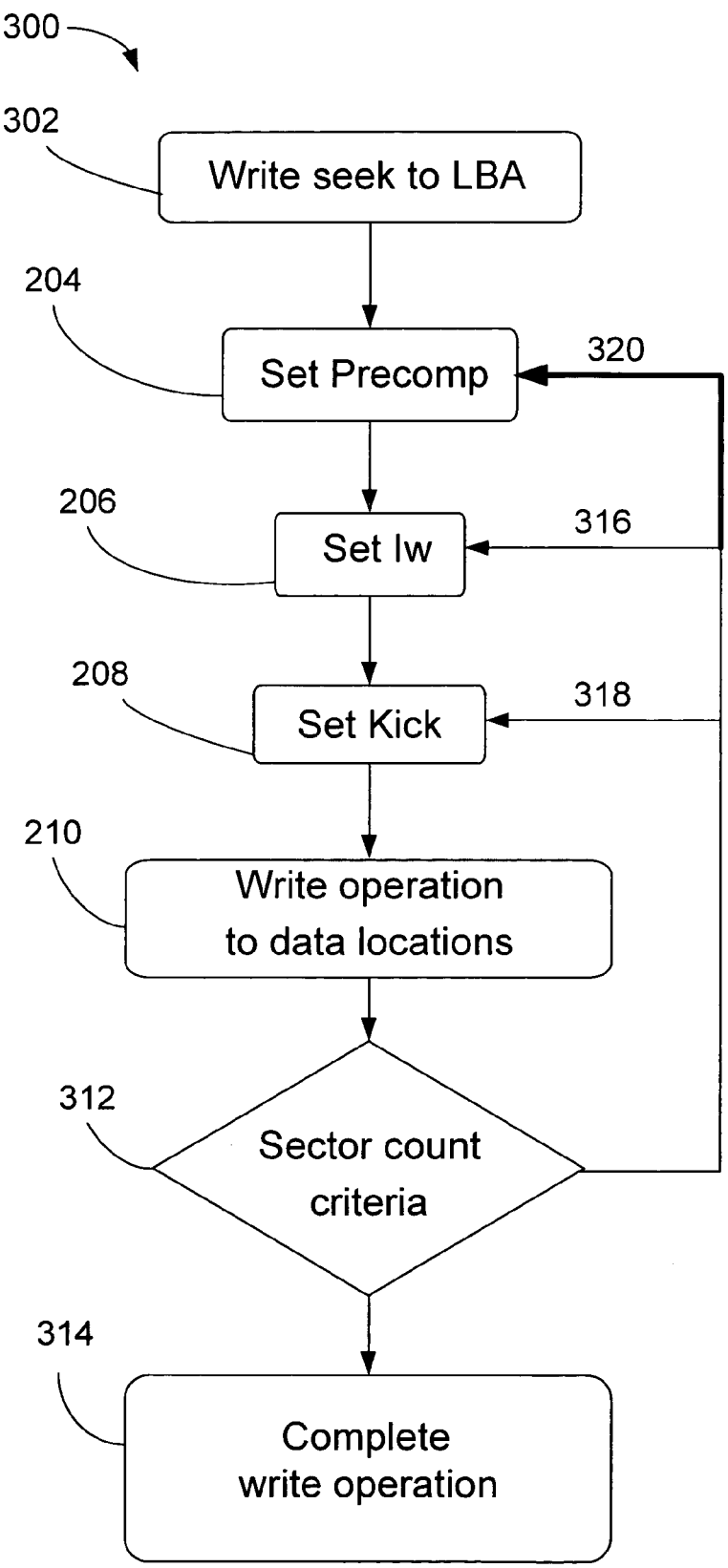
FIG. 15 shows a flow-chart summary of the precompensation-latching method of the present invention.

To summarize the differences between the prior art and the present invention in another way, FIGS. 12-14 show flow charts of three compensation schemes of the prior art, and FIG. 15 shows the precompensation method of the present invention.

In FIG. 12, the most basic method 200 is shown. First, a write seek to Logical-Block-Address (or "LBA", for short) 202 is performed. An LBA is a logical index by which the disk-drive can map to a physical head and a physical data-storage location in the drive, ie., the cylinder and the sector. In other words, it is the address of the physical whereabouts of the stored data. Precompensation values are set 204, and the write current Iw is set 206. Finally write operation to the data locations is performed 210.

In FIG. 13 a slightly more sophisticated method 250 is shown. Again, a write seek to LBA 202 is performed. Precompensation values are set 204, and the write current Iw is set 206. Then, as a new step, the Kick current is set 208. Finally write operation to the data locations is performed 210.

In FIG. 14 a yet more sophisticated method 260 is shown. Again, a write seek to LBA 202 is performed. Precompensation values are set 204, write current Iw is set 206 and Kick current is set 208. Write operation to the data locations is performed 210, but when it is finished, a sector count criteria decision is made 212. Depending on the sector count, an adjustment to the write current Iw 216 is made, an adjustment to the Kick current 218 is made, or the write operation is completed 214.

FIG. 15 shows the method of the present invention 300. Again, a write seek to LBA 302 is performed. Precompensation values are set 304, write current Iw is set 306 and Kick current is set 308. Write operation to the data locations is performed 310, but when it is finished, again a sector count criteria decision is made 312. Depending on the sector count, an adjustment to the write current Iw 316 is made, an adjustment to the Kick current 318 is made, or the write operation is completed 314, but in addition, the precompensation values may be adjusted 320. This adjustment to the precompensation values allows for greater accuracy and control in data writing, as discussed above.

It should be noted that in the previous discussions, it has been assumed that the sectors will be divided into three groups, i.e. 0, 1 and 2. However, this is not to be considered to be a limitation, and it will be obvious to one skilled in the art that the sectors could be divided into 4, 5, or more groups with a precompensation factor for each, so that there may be $p_0 \ldots p_N$ factors to be used for $N_N$ sectors. Since the write head is expected to have warmed up after the initial sectors, the write-current and the overshoot ("kick") will be reduced for the remainder of the sectors which fall into the category $N_N$, and the $p_N$ value will likely return to either zero, or a positive value, the latter of which will be more suited for correcting the "conventional NLTS" which arises only from neighboring-bit's demagnetization-field, and not from the write-current-overshoots. This is expected to happen somewhere in the time frame of 0.5 to 1 msec. This is not to be construed as a limitation however.

It is also to be noted that in order to correct both positive and negative NLTS, it is possible that precompensation values may be positive as well as negative values in transition-timing shifts.

The implementation of this invention can be done in either software or hardware. A hardware implementation could be done in either the channel or the HDC (or "hard disk controller"). The write kick latching is currently done with hardware in the HDC. The implementation would work much the same way in either hardware or software. An example of a purely software implementation would require memory to store the data that tells the drive when to change the precomp value, and what to change it to. The code looks up these values from a table that allows this feature to be customized by head, zone, temperature, or any other relevant parameter. It waits until it is time to change the precomp value, and then update the hardware register.

As an example, relevant parameters:

precomp_0=precomp value for step 0 precomp_1=precomp value for step 1 precomp_n=precomp value for step n count_0=number of sectors to write for step 0 count_1=number of sectors to write for step 1 count_n=number of sectors to write for step n

Normally, $(I_0, k_0)$ setting is stronger than $(I_1, k_1)$, and so on.

Code for updating precomp:
   Change precomp to precomp_0
   Wait until number of sectors written >count_0.
   Change precomp to precomp_1
   Wait until number of sectors written>count_1
   . . .
   Change precomp to precomp_n
   Wait until number of sectors written>count_n It is to be understood that this example is one of many implementations that could be used and is not intended as a limitation.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for controlling current supplied to a write head during writing operations in a device including memory registers, the method comprising:
   A) determining a number of sector groups into which sectors of the data to be written will be grouped;
   B) loading to said memory registers a predetermined current value for each of said number of sector groups;
   C) loading to said memory registers a predetermined kick-latching value for each of said number of sector groups;
   D) loading to said memory registers a predetermined precompensation value for each of said number of sector groups;
   E) applying the first predetermined current, first predetermined kick-latching and first predetermined precompensation values of current to the sectors of the first sector group; and
   F) applying the next predetermined current, next predetermined kick-latching and next predetermined precompensation values of current to the sectors of the next sector group until the predetermined cuffent, predetermined kick-latching and predetermined precompensation values of current of the last sector group has been completed.

2. The method of claim 1, wherein:
said memory registers include preamplifier registers and B) includes loading values to said preamplifier registers.

3. The method of claim 2, wherein the last sector group is addressed in a time frame between 0.5 msec and 1 msec from the first sector group.

4. The method of claim 1, wherein:
said memory registers include preamplifier registers, and C) includes loading values to said preamplifier registers.

5. The method of claim 1, wherein:
said memory registers include channel registers, and D) includes loading values to said channel registers.

6. The method of claim 1, wherein:
at least one of said precompensation values is negative.

7. The method of claim 1, wherein:
at least one of said precompensation values is positive.

8. The method of claim 1, wherein:
said precompensation value of the last sector group is zero.

9. The method of claim 1, wherein:
said precompensation value of the last sector group is positive.

10. A method for writing data to a surface of a magnetic disk in a disk drive having a write head, the method comprising:
   A) determining a number of sector groups into which sectors of the data to be written will be grouped;
   B) setting current values, kick-latching values, and precompensation values for each of said sector groups;
   C) applying said current values, kick-latching values, and precompensation values to said writing head while writing data to data locations within each of said sector groups;
   D) performing a sector count to produce sector count criteria; and
   E) adjusting said precompensation values in accordance with said sector count criteria.

11. The method of claim 10, wherein:
at least one of said precompensation values is negative.

12. The method of claim 10, wherein:
at least one of said precompensation values is positive.

13. The method of claim 10, wherein:
said sector groups include a last sector group and said precompensation value of said last sector group is zero.

14. The method of claim 10, wherein:
said sector groups include a last sector group and said precompensation value of said last sector group is positive.

15. The method of claim 10, wherein the last of the sector groups is addressed in a time frame between 0.5 msec and 1 msec from the first of the sector groups.

16. A method for writing data to a surface of a magnetic disk in a disk drive having a write head, the method comprising:
A) grouping a number of sectors into sector groups designated $N_O \ldots N_N$; which data is to be written;
B) determining current value $I_O \ldots I_N$, kick-latching values $k_O \ldots k_N$, and precompensation values $p_O \ldots p_N$ for each of said sector groups $N_O \ldots N_N$;
  i) performing a sector count to produce sector count criteria, and adjusting said precompensation values $p_O \ldots p_N$; in accordance with said sector count criteria;
C) applying said current value $I_O$, kick-latching values $k_O$, and precompensation value $p_O$ to said write head while writing to sector group $N_O$; and
D) applying said next current value I, kick-latching value k and precompensation value p to said write head while writing the next sector group N until all current values $I_N$, kick-latching values $k_N$ and precompensation values $p_N$ have been applied to said write head while writing to sector group $N_N$.

17. The method of claim 16, wherein:
at least one of said precompensation values is negative.

18. The method of claim 16, wherein:
at least one of said precompensation values is positive.

19. The method of claim 16, wherein:
said precompensation value of said last sector group $N_N$ is zero.

20. The method of claim 16, wherein:
said precompensation value of said last sector group $N_N$ is positive.

21. The method of claim 16, wherein:
the last sector group $N_N$ is addressed in a time frame between 0.5 msec and 1 msec from the first sector group $N_O$.

22. A method for adjusting precompensation values in response to non-linear transition shifts (NLTS) in writing data to a surface of a magnetic disk in a disk drive having a write head, the method comprising:
A) grouping a number of sectors into sector groups designated $N_O \ldots N_N$ into which data is to be written;
B) loading a register with current values $I_O \ldots I_N$, kick-latching values $k_O \ldots k_N$, and precompensation values $p_O \ldots p_N$ for each of said sector groups $N_O \ldots N_N$, wherein said precompensation values $p_O \ldots p_N$ are adjusted in accordance with said sector groups $N_O \ldots N_N$;
C) applying said current value $I_O$, kick-latching values $k_O$, and precompensation value $p_O$ to said write head while writing sector group No; and
D) applying said next current value I, kick-latching value k and precompensation value p to said write head while writing to the next sector group N until all current values $I_N$, kick-latching values $k_N$ and precompensation values $p_N$ have been applied to said write head while writing to sector group $N_N$.

23. The method of claim 22, wherein the precompensation value $p_N$ is zero.

24. The method of claim 22, wherein the precompensation value $p_N$ is positive.

25. The method of claim 22, wherein:
at least one of said precompensation values is negative.

26. The method of claim 22, wherein:
at least one of said precompensation values is positive.

27. The method of claim 22, wherein the last sector group $N_N$ is addressed in a time frame between 0.5 msec and 1 msec from the first sector group $N_O$.

* * * * *